US007556679B2

(12) United States Patent
Lee et al.

(10) Patent No.: US 7,556,679 B2
(45) Date of Patent: Jul. 7, 2009

(54) PROCESSES FOR PREPARING PHASE CHANGE INKS

(75) Inventors: Frank Ping-Hay Lee, Oakville (CA); Raymond Wan-Ning Wong, Mississauga (CA); Sheau Van Kao, Oakville (CA)

(73) Assignee: Xerox Corporation, Norwalk, CT (US)

( * ) Notice: Subject to any disclaimer, the term of this patent is extended or adjusted under 35 U.S.C. 154(b) by 828 days.

(21) Appl. No.: 11/197,600

(22) Filed: Aug. 4, 2005

(65) Prior Publication Data

US 2007/0030322 A1 Feb. 8, 2007

(51) Int. Cl.
*C09D 11/00* (2006.01)
*B28C 5/00* (2006.01)

(52) U.S. Cl. ..................................... 106/31.13; 366/15

(58) Field of Classification Search ................. 264/349; 106/31.13, 31.29, 31.61; 366/15, 91, 136
See application file for complete search history.

(56) References Cited

U.S. PATENT DOCUMENTS

| | | | | | |
|---|---|---|---|---|---|
| 2,167,243 | A | * | 7/1939 | Lichtenberg et al. | 366/58 |
| 3,653,932 | A | | 4/1972 | Berry et al. | |
| 4,390,369 | A | | 6/1983 | Merritt et al. | |
| 4,484,948 | A | | 11/1984 | Merritt et al. | |
| 4,560,281 | A | * | 12/1985 | Harris et al. | 366/15 |
| 4,684,956 | A | | 8/1987 | Ball | |
| 4,851,045 | A | | 7/1989 | Taniguchi | |
| 4,889,560 | A | | 12/1989 | Jaeger et al. | |
| 4,889,761 | A | | 12/1989 | Titterington et al. | |
| 5,006,170 | A | | 4/1991 | Schwarz et al. | |
| 5,151,120 | A | | 9/1992 | You et al. | |
| 5,221,335 | A | | 6/1993 | Williams et al. | |
| 5,372,852 | A | | 12/1994 | Titterington et al. | |
| 5,496,879 | A | * | 3/1996 | Griebel et al. | 524/320 |
| 5,531,425 | A | * | 7/1996 | Skibo et al. | 266/208 |
| 5,575,844 | A | * | 11/1996 | Bradshaw | 106/680 |
| 5,621,022 | A | | 4/1997 | Jaeger et al. | |
| 5,782,966 | A | | 7/1998 | Bui et al. | |
| 5,800,600 | A | | 9/1998 | Lima-Marques et al. | |
| 5,902,841 | A | * | 5/1999 | Jaeger et al. | 523/161 |
| 5,994,453 | A | | 11/1999 | Banning et al. | |
| 6,174,937 | B1 | | 1/2001 | Banning et al. | |
| 6,309,453 | B1 | | 10/2001 | Banning et al. | |
| 6,380,423 | B2 | | 4/2002 | Banning et al. | |
| 6,858,070 | B1 | | 2/2005 | Wong et al. | |
| 6,860,930 | B2 | | 3/2005 | Wu et al. | |
| 6,878,198 | B1 | | 4/2005 | Drappel et al. | |
| 7,288,605 | B2 | * | 10/2007 | Krueger et al. | 525/459 |
| 2005/0113482 | A1 | | 5/2005 | Wong et al. | |

FOREIGN PATENT DOCUMENTS

DE 42 05636 C2 2/1992

(Continued)

*Primary Examiner*—Joseph S. Del Sole
*Assistant Examiner*—David N Brown, II
(74) *Attorney, Agent, or Firm*—Pillsbury Winthrop Shaw Pittman, LLP

(57) ABSTRACT

The presently disclosed embodiments are directed to processes for making phase change or solid ink used in ink jet system recording apparatuses (e.g., printer, copying machine, facsimile, word processor, plotter, and the like). More particularly, the embodiments pertain to the preparation of pigment or dye-based solid ink using a rotor-stator style, in-line homogenizer.

20 Claims, 3 Drawing Sheets

FOREIGN PATENT DOCUMENTS

| | | | |
|---|---|---|---|
| DE | 42 05713 | C2 | 2/1992 |
| EP | 0187352 | A2 | 7/1986 |
| EP | 0206286 | A1 | 12/1986 |
| EP | 0206286 | B1 | 12/1986 |
| EP | 0187352 | B1 | 7/1991 |
| WO | WO 94/04619 | A1 | 3/1994 |

* cited by examiner

PROCESSES FOR PREPARING PHASE CHANGE INKS

BACKGROUND

The presently disclosed embodiments are directed to processes for making phase change or solid ink used in ink jet system recording apparatuses (e.g., printer, copying machine, facsimile, word processor, plotter, and the like). More particularly, the embodiments pertain to the preparation of pigment or dye-based solid inks using a high shear in-line homogenizer with a rotor-stator style blade for improved dispersion. In addition, the in-line homogenizer uses multiple stages tooling and is installed outside of the vessel so that the homogenizers are not limited to specific mixing chamber geometries or vessel geometries.

Recording apparatuses using an ink jet system employ a recording method in which a liquid or fused solid ink is ejected as small droplets through a nozzle, slit, porous film, or the like, and deposited onto the surface of a recording material such as paper, cloth, or film to record letters or figures on the recording material. Such systems are advantageous because the apparatus is compact, inexpensive and noiseless. An ink for use in an ink jet recording apparatus mainly comprises a liquid, a coloring material and additives. Such ink is generally required to have properties including: the formation of a record having high-resolution and high-density uniform image without causing blotting or fogging on the recording material, the ability to be used without clogging nozzle tips due to drying of the ink, the facilitation of ejection responsibility and stability so that the nozzle tip is kept in good condition, the exhibition of good drying property, the formation of an image with good fastness, and the high stability to ensure long-term storage.

Additives that may be added to the dispersed coloring material and the liquid include a surfactant or a fixing agent. A surfactant may added to lower the surface tension of the liquid to obtain acceptable levels of transfer, coating spread and adhesion. A fixing agent may be added to prevent permeation of the coloring material in the ink. Other additives may also be included in the ink, such as antioxidants, viscosity modifiers, clarifiers, conductivity agents and dyes used as auxiliary colorants, as disclosed in U.S. Pat. No. 6,878,198 and U.S. Patent Publication No. 20050113482, the disclosures of each of which are totally incorporated herein by reference.

Factors such as droplet and particle size may have effect on whether the ink formed will have the desired properties. Pigment solids should be small and evenly dispersed to ensure that the droplets will be small and uniformly emulsified. Providing uniformly dispersed pigments in small droplets may result in higher particle surface area, and thus, more brilliant color and smoother finish. Providing smaller particle and droplet size may also further facilitate better penetration into the recording material so that the image created dries better, is more resistant to rubbing or bleeding and may impart higher stability for long-term storage. The quality of the product ink may be controlled by "Filter Tests," e.g., a ink-making process is satisfactory if the product ink passes such a "Filter Test."

The finished ink is evaluated by a number of characterization tests including viscosity, thermo-gravimetric analyses, various filtration tests and print quality tests. The filtration tests were designed to emulate flow of molten ink through a printer head. For example, one of the filtration tests conducted involves measuring 100 grams of molten ink at fixed temperature (105-135° C.) and pressure (15 psig) as the ink passes through a 0.45 μm glass fiber membrane per unit time. An ink which meets the specification will pass through the 0.45 μm filter membrane in less than 5 minutes. Inks which are not homogenized adequately or filtered properly will not pass through under 5 minutes.

Although different types of ink may be used with ink jet systems, phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

In general, phase change or solid inks (sometimes also referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference. Phase change inks have also been used for applications such as postal marking and industrial marking and labeling.

Phase change inks for color printing typically comprise a phase change ink carrier composition which is combined with a phase change ink compatible pigment colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 4,889,560 (Jaeger et al.), the disclosure of which is totally incorporated herein by reference, discloses a phase change ink carrier composition combined with a compatible colorant to form a phase change ink composition. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

U.S. Pat. No. 4,889,761 (Titterington et al.), the disclosure of which is totally incorporated herein by reference, discloses a method for producing a light-transmissive phase change ink printed substrate is described which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path. In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

U.S. Pat. No. 5,372,852 (Titterington et al.), the disclosure of which is totally incorporated herein by reference, discloses a phase change ink composition that is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet print head, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

U.S. Pat. No. 5,994,453 (Banning et al.), the disclosure of which is totally incorporated herein by reference, discloses phase change carrier compositions made from the combination of at least one urethane resin; at least one urethane/urea resin; at least one mono-amide; and at least one polyethylene wax. The order of addition of the reactants to form the reactant product urethane resin and urethane/urea resin permits the tailoring or design engineering of desired properties.

U.S. Pat. No. 6,174,937 (Banning et al.), the disclosure of which is totally incorporated herein by reference, discloses a phase change ink comprising a material of the

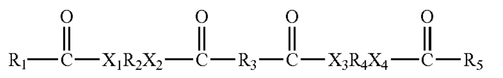

wherein X.sub.1, X.sub.2, X.sub.3, and X.sub.4 are segments comprising atoms selected from groups V and VI of the periodic table; wherein at least one R.sub.1 and R.sub.5 comprises at least 37 carbon units; and wherein R.sub.2, R.sub.3, and R.sub.4 each comprise at least one carbon unit. The invention further encompasses a composition of matter, as well as methods of reducing coefficients of friction of phase change ink formulations.

U.S. Pat. No. 6,309,453 (Banning et al.), the disclosure of which is totally incorporated herein by reference, discloses colorless compounds having a central core and at least two arms extending from the core. The core can comprise one or more atoms. The at least two arms have the

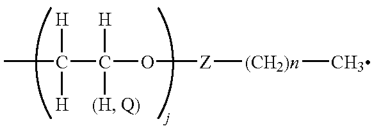

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the

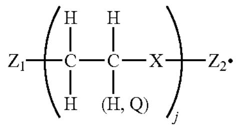

In such formula, X is a single atom corresponding to N or O; Z.sub.1 and Z.sub.2 are substituents comprising one or more atoms, and can be the same as one another or different from one another; and j is an integer from 1 to about 50.

U.S. Pat. No. 6,380,423 (Banning et al.), the disclosure of which is totally incorporated herein by reference, discloses colorless compounds having a central core and at least two arms extending from the core. The core can comprise one or more atoms. The at least two arms have the

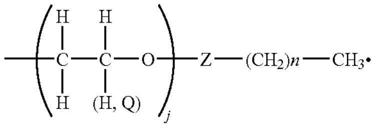

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the

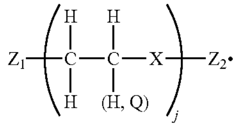

In such formula, X is a single atom corresponding to N or O; Z.sub.1 and Z.sub.2 are substituents comprising one or more atoms, and can be the same as one another or different from one another; and j is an integer from 1 to about 50.

U.S. Pat. No. 5,221,335 (Williams et al.), the disclosure of which is totally incorporated herein by reference, discloses a stabilized pigmented hot melt ink containing a thermoplastic vehicle, a coloring pigment, and a dispersion-stabilizing agent to inhibit settling or agglomeration of the pigment when the ink is molten, comprising 1.5 to 20 weight percent of a nitrogen-modified acrylate polymer. A preferred dispersion-stabilizing agent is the nitrogen-modified methacrylate polymer marketed by Rohm & Haas Co. as Plexol 1525.

U.S. Pat. No. 5,800,600 (Lima-Marquez et al.), the disclosure of which is totally incorporated herein by reference, discloses a solid ink jet ink composition which is suitable for hot melt applications having a carrier having an electrical resistivity of at least 10.sup.8 Ohm·cm, insoluble marking particles, and a particle charging agent dispersed in it. The marking particle may be a pigment, an insoluble dyestuff, a polymer, or mixture thereof. The particle charging agent may be a metal soap, a fatty acid, lecithin, an organic phosphorous compound, a succinimide, a sulfosuccinate, petroleum sulfonates, a soluble or partially soluble resin such as a modified rosin ester, an acrylic, a vinyl, a hydrocarbon, or a mixture thereof. The solid ink jet ink composition may further include a viscosity controller. The ink may be capable of being heated to 155.degree. C. and have at that temperature a viscosity of between 5 to 150 centipoise.

In order to make inks that possess the desired characteristics, various techniques have been proposed. For example, U.S. Pat. No. 6,858,070 discloses the use of single high shear mixers to manufacture ink, the entire disclosure thereof being incorporated herein by reference. Dye-based solid inks are commonly manufactured by dispersing the dyes and other ink components into molten wax in mixing chambers, such as feed tanks, using batch mixers with saw-tooth style or other single-stage "in-tank" impellers. Although saw-tooth style and other single-stage high speed in-tank batch mixers are adequate for dispersion of dyes in molten wax, they do not provide the adequate shear rate necessary for breaking up pigment agglomerates to submicron sized particles. Another technique used to manufacture ink jet inks involves homogenizers that have rotor-stator style in-tank batch mixers. This batch process has been developed for preparing pigment-based solid ink by dispersing the pigments and other ingredients into molten wax in a type of mixing chamber using a rotor-stator style in-tank, high-shear batch mixer. These rotor-stator style batch mixers are designed for specific tank geometry, however, and typically can only accept one set of rotor-stator tooling. This makes the rotor-stator style batch mixers less flexible and more expensive to use.

In addition, in-tank batch mixers do not permit the process to be set up in "discrete passes" configuration, which produces narrow particle size distribution and allows all of the materials to be processed by the in-line homogenizer and its rotor-stator tooling between passes.

Thus, while known processes and systems are suitable for their intended purposes, a need remains for methods for preparing phase change or solid inks in a system that is more flexible and has more enhanced homogenization capabilities.

SUMMARY

According to aspects illustrated herein, there is provided a process for making pigment or dye-based solid inks used in ink jet systems that uses multiple-stage in-line dispersers or homogenizers. Such dispersers or homogenizers may be used with more than one set of rotor-stator tooling and are installed external to the vessel(s) Thus, they are not limited to specific mixing vessel(s) geometries.

An embodiment of the present invention may include: a process for preparing a phase change ink composition, comprising obtaining an extrusion of coloring material from an extruder, forming a dispersion of the coloring material in a medium at a temperature above 100° C., mixing the dispersion in an in-line homogenizer at high shear until the particle size of the coloring material is less than 0.2 μm, and filtering the dispersion at a molten state with one or more filters.

Another embodiment may also include: a system for preparing a phase change ink composition, comprising an in-line homogenizer, the in-line homogenizer having an inlet conduit and an outlet, a dispersion of a coloring material in a medium at a temperature above 100° C., wherein the dispersion is formed in an extruder prior to being added to the in-line homogenizer, and one ore more filters in flow communication with the in-line homogenizer.

BRIEF DESCRIPTION OF THE DRAWINGS

For a better understanding of the present invention, reference may be had to the accompanying figures.

DETAILED DESCRIPTION

Figure 1:
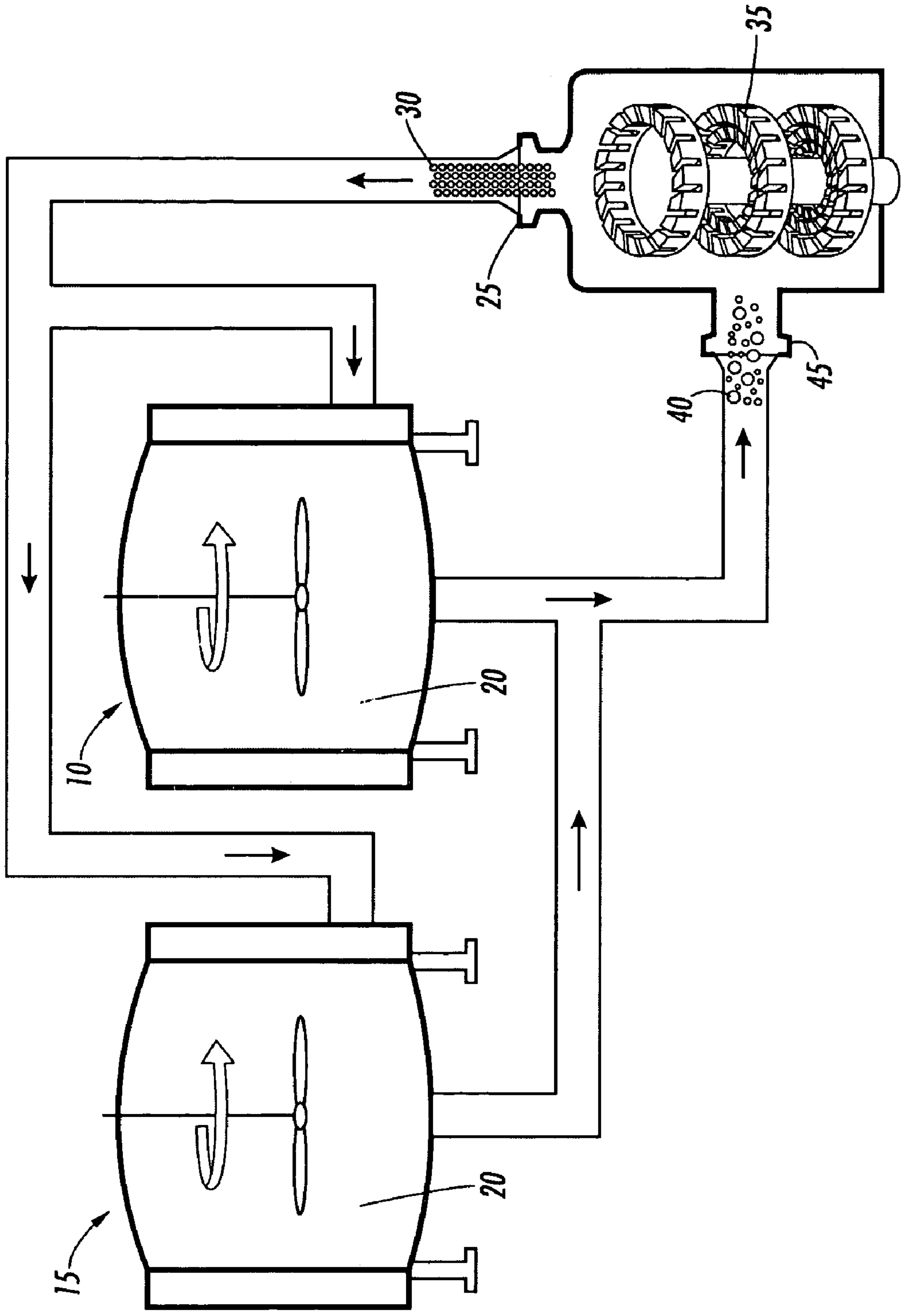
FIG. 1 is a schematic illustration of a homogenizer with two mixing chambers set up in a discrete passes configuration in accordance with the invention.

In the following description, reference is made to the accompanying drawings, which form a part hereof and which illustrate several embodiments of the present invention. It is understood that other embodiments may be utilized and structural and operational changes may be made without departure from the scope of the present invention.

Embodiments of the present invention relate to processes, with improved dispersion capabilities, for making pigment or dye-based solid inks used in ink jet systems. The inks used in an ink jet recording apparatus mainly comprise a liquid, a coloring material and additives. The ink is made by blending a molten mixture of coloring material, wax, and the like, in a mixing chamber, such as a feed tank, and dispersing the molten mixture, followed by dispersing the mixture using a multiple-stage in-line disperser or homogenizer. In-line dispersion involves feeding the mixture into an in-line disperser or homogenizer, which is equipped with multiple sets of tooling, for a pre-determined number of equivalent passes, or until the ink meets quality control standards including particle size distribution and filtration tests. The product ink may be filtered through cartridge filters before being discharged into containers.

Filtration of the finished ink product is a further step involved in the preparation of pigmented ink. The filtration step occurs at the molten state of the ink with sub-micron cartridge filters. In one embodiment, the filtration parameters and specifications include a preferred temperature range of about 105-120° C., pressure about 3-10 psig, filter cartridge pore size about 0.2-1.0 μm, with one or more filters in series, and filter cartridge materials of construction including glass fiber, nylon-66, and polytetrafluoroethylene (PTFE). In addition, during development of new formulations and processes, batch variations may be checked by taking samples from different parts of each batch and comparing them with the same quality control methods, as described above.

The in-line homogenizer or disperser can be set up in two different configurations. In re-circulation configuration, one feed tank is used. The content in the feed tank is drawn from the bottom, circulated through the in-line homogenizer loop, and returns to the top of the feed tank. In-line homogenizers may produce narrower particle distribution than batch homogenizers and further have the advantage of being capable of being set up in a discrete passes configuration. In the discrete passes configuration, two feed tanks (e.g., Tank A and Tank B) are required. Operations in discrete passes involve emptying one tank (Tank A) totally into another (Tank B) to achieve one pass. Using appropriate process control and piping hardware, the flow direction will be reversed and the content from Tank B will be pumped through the in-line homogenizer and discharged to Tank A, and the process is repeated. The discrete passes configuration also produces narrow particle size distribution, and thus, using an in-line homogenizer set up in such a configuration will facilitate making ink with a narrower particle distribution than traditionally produced.

This type of dispersion system or homogenizer may be used with more than one set of mixing devices, for example, rotor-stator style blades or other similar tooling. Therefore, embodiments of the invention are not limited to specific mixing chamber geometries. Furthermore, embodiments of the invention may use a multiple-stage in-line homogenizer, that is high-shear and in a rotor-stator style, with feed tank(s) set up in either discrete passes or re-circulation configuration to ensure that all inks pass through the homogenizer for the most uniform products. The discrete passes configuration is not continuous and homogenizes from one mixing chamber to the next mixing chamber in separate passes. The re-circulation configuration continues the homogenization between the mixing chambers until a specific homogeneity is achieved. A suitable system to use is the IKA Model Process DR-2000/4 Multiple Stage In-line Disperser (able to use up to three different rotor-stator tooling sets). Typical rotor-stator style in-line homogenizers available from IKA, Cavitron, Kinematica, YTRON, Quadro can also accept multiple sets of tooling including pumping tooling and tooling for cresting high shear.

Such a high temperature dispersion system may include raw materials melting equipment (melters or melt tanks), one ("Re-circulation") or two ("Discrete Passes") homogenizer feed tanks, an in-line homogenizer, a sub-micron product ink filtration system which includes a gear pump and a series of sub-micron cartridge filters. When dispersing dry pigments, the pigments are first melted and blended in melt tank(s) with dispersants or dispersing agents. These agents can be polar or non-polar ingredients, such as tri-amine compounds. The melting and blending of polar and non-polar ingredients are performed in an extruder, such as disclosed in U.S. Pat. No. 6,878,198, and disclosed in U.S. Pat. Application Serial No. 2005/0113482, filed Nov. 25, 2003, entitled "Processes for Preparing Phase Change Inks," to Wong et al., which are herein incorporated by reference. For example, carbon black pigments are first melted and mixed in a polar compound in an extruder. The polar compound may be a tri-amine compound. The temperature of the extruder may be set at about 50-120° C. Next, the dispersed pigment and other ink components are further mixed in the feed tank with the in-line homogenizer.

In certain embodiments, the dispersion is added to a mixing chamber and mixed until the coloring material forms a homogenous mixture with pigment particles size less than 0.2 micron.

In a discrete passes configuration, control valves direct the flow of the forming ink 20. The solids 30 are fed into the homogenizer 35 through the inlet 25 and passed through the rotor-stator system in the homogenizer 35. The flow is directed from a first feed tank 10 to a second feed tank 15, and when the first feed tank 10 is completely empty the flow is switched to flow from the second feed tank 15 to the first feed tank 10. Once the second feed tank 15 is completely empty, the flow is again directed to flow from the first feed tank 10 to the second feed tank 15. Thus, the flow directed between the two tanks depends on the level in each tank. As shown in FIG. 1, this cycle is repeated until the desired properties are achieved in the ink 40. The homogeneous, dispersed final product 40 is then produced through the outlet 45. The discrete passes configuration may result in the most homogeneous product.

Figure 2:
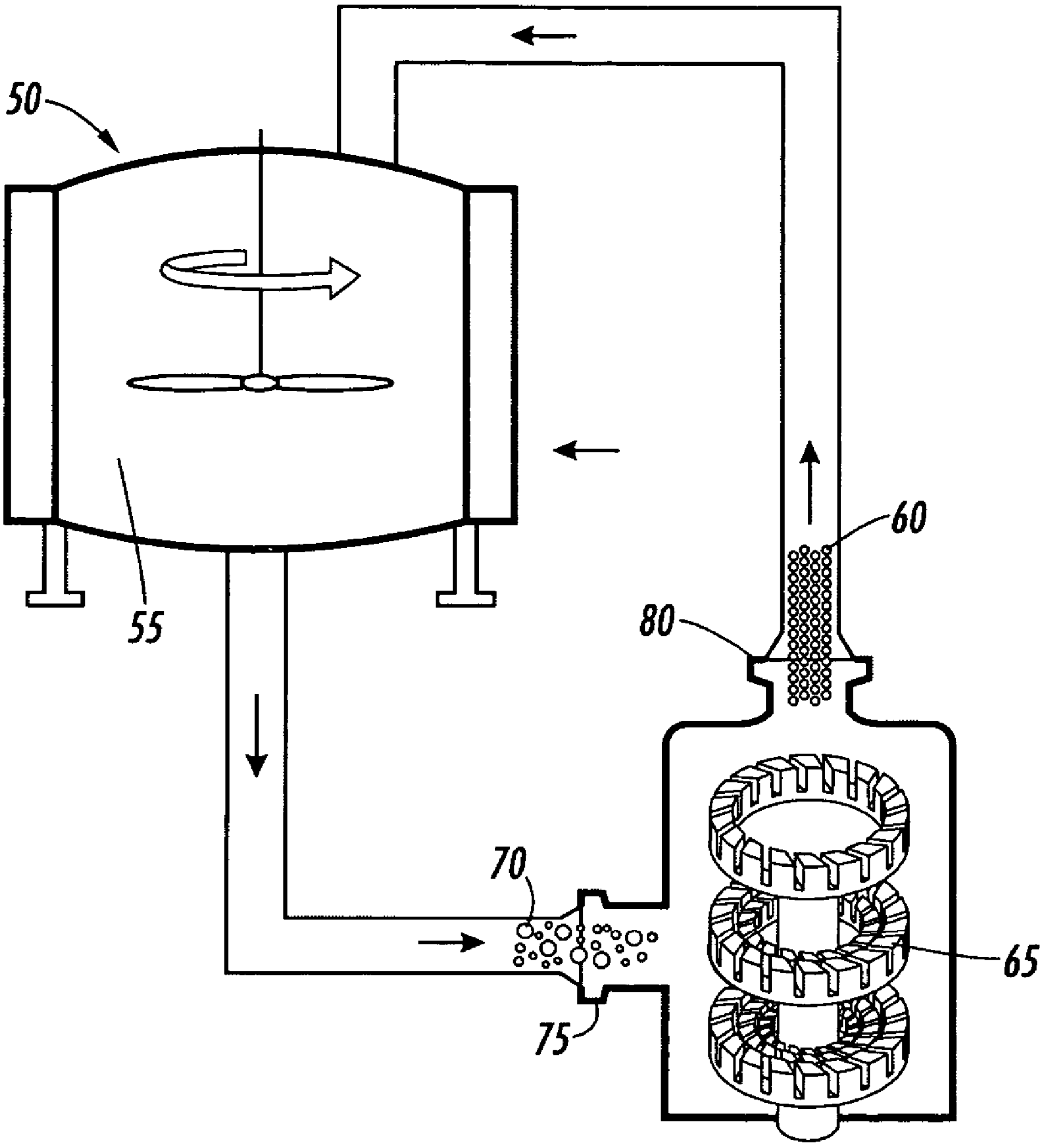
FIG. 2 is a schematic illustration of a homogenizer with one mixing chamber set up in a re-circulation configuration in accordance with an embodiment of the invention.

In a re-circulation configuration, the schematic of which is shown in FIG. 2, one feed tank 50 is used to re-circulate the forming ink 55. The solids 60 are fed into the homogenizer 65 through the inlet 80 and passed through the rotor-stator system in the homogenizer 65. The forming ink 55 is re-circulated in the feed tank 50 until the desired properties are achieved in the ink 70. The homogeneous, dispersed final product 70 is then produced through the outlet 75. The equivalent passes needed to obtain the final ink product in the re-circulation system is expressed by the following formula:

Equivalent passes=total time/(batch size/volumetric flow rate).

In one embodiment, the equivalent passes needed to obtain the ink product is about 100 to about 200 equivalent passes. In either type of mixing chamber configuration, the homogenizer provides the necessary high shear to break up any pigment agglomerates that are formed during the dispersion of the pigment in the liquid. The multiple-stage in-line may be used with more than one set of rotor-stator tooling.

Figure 3:
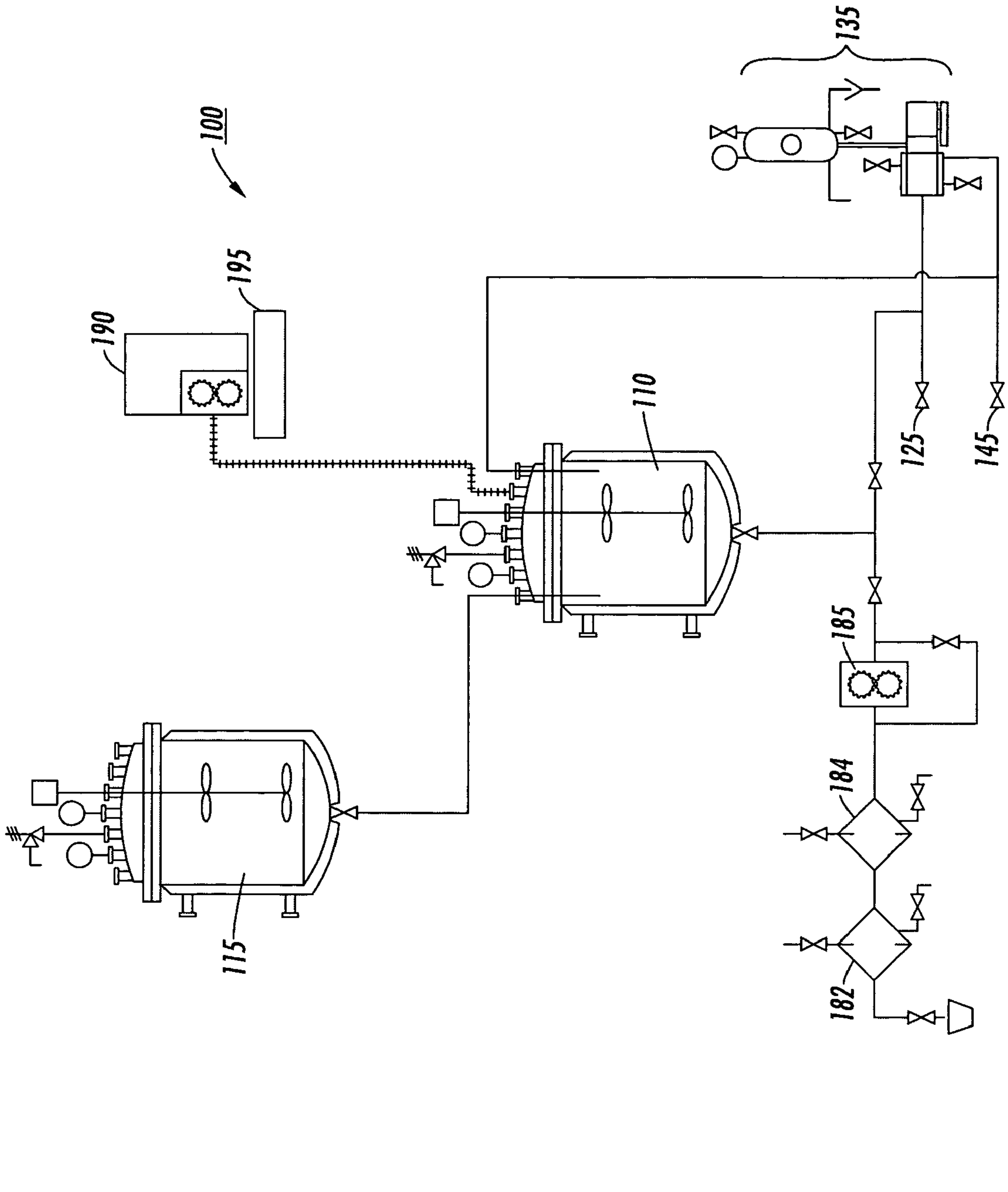
FIG. 3 is a schematic of piping and instrumentation of a plant system set up in a discrete passes configuration in accordance with an embodiment of the invention.

In FIG. 3, a piping and instrumentation diagram of a plant system 100 is provided. The system 100 may be used with embodiments of the present invention and FIG. 3 shows the system 100 being used in conjunction with a discrete passes configuration. Raw materials may be melted in a melter 190, which is attached by piping to a first feed tank 110. A scale 195 may be attached to the melter 190 to facilitate convenient weighing of the portions of materials to be used. The materials may be introduced into the in-line homogenizer 135 through a feed drain 125 and control valves direct the flow from the homogenizer to the first feed tank 110 and the second feed tank 115, where the flow will be directed between the two feed tanks 110 and 115 until desired properties in the forming ink are achieved. The material transfer may be driven by a pump 185, such as for example a jacketed gear pump. The system 100 may further include filters 182 and 184 to provide further processing of the ink product. In one embodiment, jacketed cartridge filters are used for the filtering step. A sample drain 145 may also be included for providing an outlet from which to extract samples of the ink product to test the properties during processing.

Conditions under which multiple stage in-line homogenizers operate under may include typical process parameters and equipment specifications for the XRCC pilot plant carbon black solid ink process. For example, the temperature of the feed tank and loop is generally higher than the melting point of the ink (e.g., 120-135° C., depending on the wax used). The melting point for carbon black low melt formulation is 120° C. The pressure of the feed tank is maintained at atmospheric while that of the loop has a back pressure of 1-10 psig, that is maintained in the in-line re-circulation loop to ensure that the line is filled. The back pressure also prevents “cavitation” in the in-line homogenizer. The tip speed for rotor-stator type in-line homogenizers is typically 4,000-10,000 fpm (20-51 m/s). Typical shear rates ($\gamma=\Delta v/\Delta x$) of the in-line homogenizer is in the range of about 10,000-100,000 Hz.

The typical tooling for the carbon black solid ink process with an IKA in-line homogenizer, includes but is not limited to, pump tools, medium rotor-stator tools, and fine rotor-stator tools. The pump impeller tool has impeller blades that are designed to work like a centrifugal pump to circulate the liquid through the loop at 5-10 GPM, depending on the viscosity of the melt mixture. The medium and fine rotor-stator tool sets may have different layers with slots of different gap sizes (e.g., 0.5-5 mm) to provide high shear under high speed.

In further embodiments, the coloring material may be a pigment or a dye. Additives may also be added to the dispersed coloring material and the liquid, such as for example, a surfactant or a fixing agent. A surfactant may added to lower the surface tension of the liquid to obtain acceptable levels of transfer, coating spread and adhesion. A fixing agent may be added to prevent permeation of the coloring material in the ink. Examples of the fixing agent which can be used include a polyvalent metal salt, an organic amine and a salt thereof, a quaternary ammonium salt, a cationic polymer, a nonionic polymer and an anionic polymer. The fixing agent may take the form of an aqueous solution or the like. The fixing agent may be coated on a recording material before or after the ink recording or simultaneously with the ink recording. For the coating of the fixing agent, a method of ejecting the fixing agent form an orifice in response to a signal and coating it on a recording material is effective and efficient. In addition, the inks may contain other additives, such as antioxidants, viscosity modifiers, clarifiers, conductivity agents and dyes used as auxiliary colorants.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Ink I Preparation Process (with High Shear In-Line Homogenizer)

A tri-amide resin prepared as described in U.S. Pat. No. 6,860,930, the disclosure of which is totally incorporated herein by reference, was processed through a hammer mill to powder form. Thereafter, 3 parts of powdered tri-amide resin was blended with 1 part NIPEX 150 carbon black (manufactured by Degussa Canada). The powder mixture was then processed in a Warner & Pfeiderer Model ZSK30 twin-screw extruder at a rate of 10 lb/hr. The barrels of the extruder were maintained at 60° C. and the rotational speed of the screws was kept at 150 rpm.

The resulting extruded carbon black-Triamide resin dispersion was melt mixed together with 1.8 Kg OLOA11000, a succinimide dispersant (available from Chevron), 12.4 Kg of stearyl amide (KEMAMIDE S180 from Witco humko Chemical division), 7.7 Kg of KE-100 Resins, triglycerides of hydrogenated abietic (rosin) acid (commercially available from Arakawa Chemical Industries, Ltd.) and 0.18 Kg of NAUGARD N445 (from Uniroyal Chemical) in a 25 gallon mixing tank, equipped with a mechanical stirrer, for 1 hour at 130° C. The dispersion mixture was then processed by an IKA three-stage in-line homogenizer, Model DR3-6/6A, equipped with a pump, a medium and a fine rotor-stator tooling at tip speed of approximately 7 m/s and volumetric flow rate of approximately 10 gallons per minute for 2 hours at 120° C. A total 36 Kg of distilled POLYWAX 500 (the viscosity of the distilled POLYWAX preferably at 10% to 100% higher than non-distilled POLYWAX 500) which was pre-melted in another mixing tank at 120° C., was then charged to the 25 gallon mixer tank. The resulting mixture was further processed with the same in-line homogenizer at 120° C. under the same tip speed and flow rate for another 2 hours. After the second homogenization, the resulting dispersion was stirred and mixed in the 25 gallon reactor for another 30 minutes before filtration to remove residual large particles.

The filtration was done with two 30 inch long, 1 micron, 0.45 micron porosity, pleated glass-fiber cartridge filters connected in series.

The resulting ink was then evaluated for ink jet applications. With the ink viscosity maintained at a fixed viscosity, preferably around 10.6 cps, 100 g of the ink was sampled and "aged" inside an oven at 110° C. for 48 hours. The aged ink was then filtered through a 47 mm, 0.45 micron glass-fiber disc filter at 110° C. at 15 psi.

The ink sample obtained from Example I after aging passed through the 0.45 micron filter within 2.5 minutes. To pass the filter test, a 100 g sample of ink which has been aged at 110° C. for 48 hours must be able to pass through a 47 mm diameter, 0.45 micron opening, glass fiber disc filter at 110° C. and 15 psig in less than 5 minutes. Inks which failed the test generally are not dispersed and/or filtered properly. Thus, the ink in this example passed the filter test.

Example II

Ink II Preparation Process (with High Shear Batch Homogenizer

This example was conducted in a 5-gal jacketed tank equipped with an IKA ULTRA-TURRAX Model T65 high shear batch mixer as well as a low shear agitator. The extruded carbon black-Triamide resin dispersion, OLOA11000, stearyl amide KEMAMIDE S180, triglycerides of hydrogenated abietic (rosin) acid and NAUGARD N445 (from Uniroyal Chemical) were first melted and mixed with the low shear agitator for 1 hr at 130° C. and then followed by 2 hours of processing at 120° C. with the IKA Model T65 high shear batch mixer. Distilled POLYWAX 500 was then added to the 5-gal tank and the resulting mixture was processed by the IKA high shear batch mixer for another 90 minutes at 120° C.

A 100 g sample of the ink prepared by this process was taken and evaluated according to the filter test method described in Example I. The aged sample passed through the 0.45 micron filter in less than 3.5 minutes, and thus, passed the filter test.

Example III

Ink III Preparation Process (with Saw-Tooth Impeller)

This example was conducted in the same manner as in Example II, except that the IKA ULTRA-TURRAX Model T65 high shear batch mixer was replaced with a LIGHTNING Model R-500 saw-toothed impeller.

A 100 g sample of the ink prepared by this process was taken and evaluated according to the filter test method described in Examples I and II. The aged sample took longer than 5 minutes to pass through the 0.45 micron filter. Thus, the ink in this example failed the filter test.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A process for preparing a phase change ink composition, comprising:

(a) obtaining an extrusion of coloring material from an extruder;

(b) forming a dispersion of the coloring material in a medium at a temperature above 100° C.

(b) mixing the dispersion in an in-line homogenizer at high shear until the particle size of the coloring material is less than 0.2 μm, wherein the in-line homogenizer includes a first mixing chamber and a second mixing chamber and the first mixing chamber and the second mixing chamber are joined together in flow communication by a conduit, and further wherein the dispersion is circulated between the first mixing chamber and the second mixing chamber; and (c) filtering the dispersion at a molten state with one or more filters.

2. The process of claim 1, wherein 100 grams of the phase change ink composition in a molten state at a fixed temperature of about 105° C. to about 135° C. and a fixed pressure of about 15 psig passes through a 0.45 μm glass fiber membrane in less than 5 minutes.

3. The process of claim 1, wherein the medium is at a temperature of about 105° C. to about 140° C.

4. The process of claim 1, wherein the coloring material is selected from the group consisting of a pigment and a dye.

5. The process of claim 1, wherein an additive is added to the dispersion, the additive being selected from the group consisting of a surfactant and a fixing agent.

6. The process of claim 1, wherein the first mixing chamber has a first set of blades.

7. The process of claim 1, wherein the dispersion is mixed in the in-line homogenizer for about 100 to about 200 equivalent passes.

8. The process of claim 1, wherein the second mixing chamber has a second set of blades.

9. The process of claim 1, wherein the first mixing chamber and the second mixing chamber are joined together in flow communication by a conduit, and wherein further mixing of the dispersion takes place in the conduit.

10. The process of claim 1, wherein the dispersion is discretely mixed in the first mixing chamber until the coloring material forms homogenous particles greater than 1.0 μm, and then discretely mixed in the second mixing chamber until the coloring material forms homogenous particles of less than 0.2 μm.

11. A system for preparing a phase change ink composition, comprising:

(a) a dispersion of a coloring material in a medium at a temperature above 100° C., wherein the dispersion is formed in an extruder prior to being added to an in-line homogenizer;

(b) an in-line homogenizer, wherein the in-line homogenizer has a first mixing chamber and a second mixing chamber and the first mixing chamber and the second mixing chamber are joined together in flow communication by a conduit such that the dispersion is circulated between the first mixing chamber and the second mixing chamber; and (c) one or more filters in flow communication with the in-line homogenizer.

12. The system of claim 11, wherein the dispersion is mixed at high shear until the coloring material forms homogenous particles of less than 0.2 μm.

13. The system of claim 12, wherein the dispersion is filtered through the one or more filters before removing.

14. The system of claim 11, wherein the coloring material is selected from the group consisting of a pigment and a dye.

15. The system of claim 11, wherein the medium is at a temperature of about 105° C. to about 140° C.

16. The system of claim 11, wherein an additive is added to the dispersion, the additive being selected from the group consisting of a surfactant and a fixing agent.

17. The system of claim 11, wherein the first mixing chamber has a first set of blades.

18. The system of claim 17, wherein the second mixing chamber has a second set of blades.

19. The system of claim 11 further including a sample drain for providing an outlet from which to extract samples of the dispersion to test during processing.

20. The system of claim 16, wherein the fixing agent is selected from the group consisting of a polyvalent metal salt, an organic amine and a salt thereof, a quaternary ammonium salt, a cationic polymer, a nonionic polymer and an anionic polymer.

* * * * *